April 18, 1933. F. S. BELKNAP 1,904,713
BRAKE TESTER
Filed Dec. 13, 1929
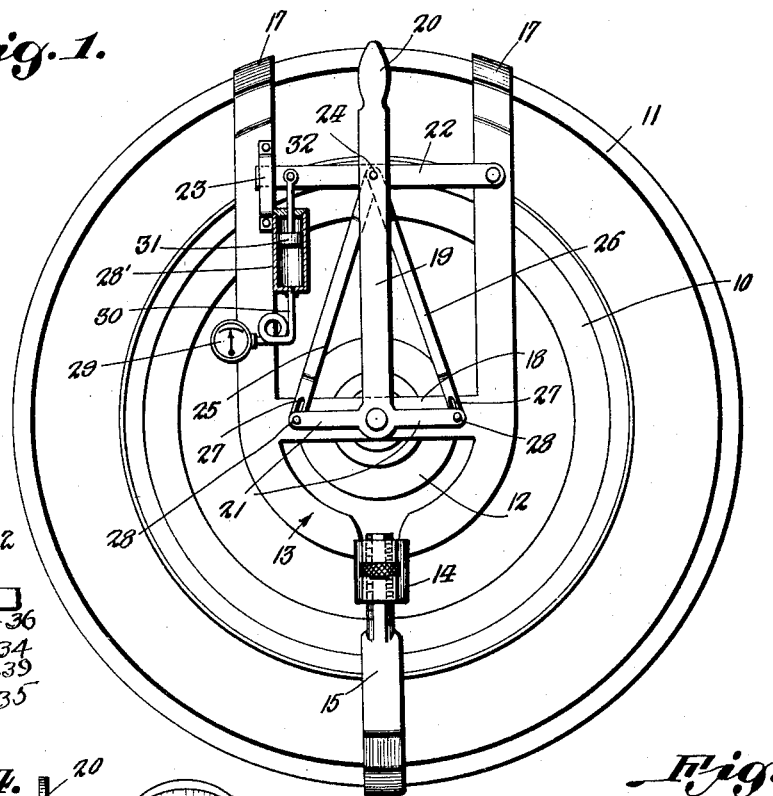
Fig. 1.
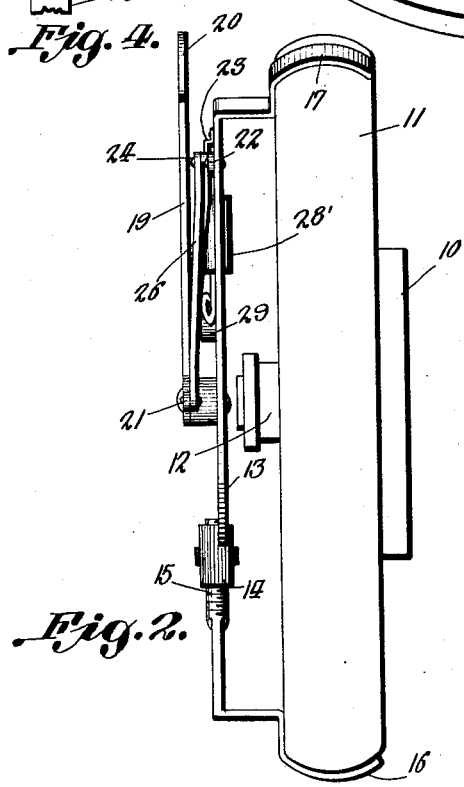
Fig. 4.
Fig. 2.
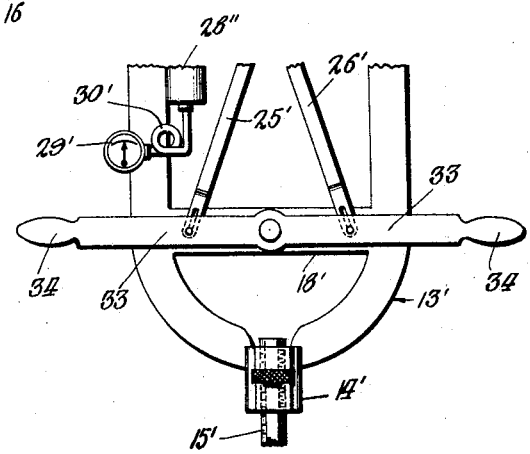
Fig. 3.
F. S. Belknap, Inventor
By
Attorney Patented Apr. 18, 1933

1,904,713

UNITED STATES PATENT OFFICE

FRANKLIN S. BELKNAP, OF KANSAS CITY, MISSOURI

BRAKE TESTER

Application filed December 13, 1929. Serial No. 413,896.

This invention relates to new and useful improvements in testing devices, and particularly to devices for testing the efficiency of automobile brakes.

The principal object of the invention is to provide a brake testing device which is simple in construction, and which can be readily applied to the wheel of an automobile, and successfully operated, regardless of where the automobile is located, thus obviating the waste of floor space occupied by the devices of this character now in use in service stations and garages.

Other objects and advantages will be apparent from the following description when taken in connection with the accompanying drawing.

In the drawing:

Figure 1 is a side elevation of the invention applied to a wheel of an automobile.

Figure 2 is a side elevation of the same.

Figure 3 is an elevation of a modified form of handle lever.

Figure 4 shows a modification of the gauge, wherein a spring is used, instead of oil or air.

Referring particularly to the accompanying drawing, 10 represents a wheel of an automobile, which has the usual tire 11 thereon, and the central outwardly projecting hub 12.

Disposed against the outer face of the wheel is a substantially U-shaped member 13, from the center of the bight portion of which projects the stem 14, and adjustably mounted in this stem is the member 15, which has its outer end provided with a hook 16, for engagement over the outer face of the tire 11. The terminal of each of the arms of the U-shaped member 13 is also formed with a hook 17, for engagement over that portion of the tire diametrically opposite to that with which the hook 16 is engaged. Formed integrally with the frame member 13, and extending transversely of the bight thereof, is a bar 18, and pivotally mounted on the center of this bar is one end of a lever 19, said lever extending upwardly to a point at the side of the tire, where it is provided with a suitable handle or grip 20.

The pivoted end of the lever 19 is formed with the two diametrically opposite, outwardly extending arms 21. Pivoted on the outer end portion of one of the arms of the frame 13, and extending transversely of the frame, and across the other arm thereof, is a lever or arm 22, the free end of which is properly guided by the member 23, carried by said other arm. Pivotally connected to the intermediate portion of the arm 22, by the common pivot 24, are the upper ends of the links 25 and 26. The other end of each of the links is formed with a longitudinally extending slot 27, through which is disposed a pin 28, carried by the outer end of an arm 21, whereby said links are pivotally and slidably connected with the lever 19. Mounted on one arm of the frame 13, below the free end of the arm 22, is a vertically disposed cylinder 28', and also, mounted on said frame arm, adjacent the lower end of the cylinder, is a pressure gauge 29, said gauge being connected with the cylinder by means of the pipe 30. Movable in the cylinder is the plunger 31, the stem 32 of which is pivotally connected with the free end of the lever or arm 22. The plunger 31 may be adjustably connected with stem 32.

In Figure 3 there is shown a modified form of the lever, wherein, instead of extending upwardly from the head or pivotal end thereof, this lever has the opposite extensions 33, having hand grips 34, on their outer ends, which are grasped by the workman. The links 25' and 26' are connected with these extensions in the same manner as in the first form.

In the operation of the device, the workman engages the hooks 16 and 17 with the periphery of the tire of the wheel, and tightens same by means of the nut of the member 15. The operator then grasps the hand grip 20, of the first form, or the grips 34 of the second form, and attempts to rotate the wheel, it being understood that the brakes have been set. The resistance to this rotative movement will show on the gauge, by reason of the fact that the links operate to rock the arm 22 downwardly, whereby to push the plunger 31 down in the cylinder 28, forcing the liquid through the pipe 30. If the brakes offer too little resistance, the operator tightens the brakes to a certain degree, after which the operator again attempts to rotate the wheel, while at the same time he watches the gauge. When the gauge shows the brake to offer the required amount of resistance to rotation of the wheel, the operator removes the device and applies it to another wheel. In this way each wheel can be tested, to see that the brakes are in good order, and if not, proper adjustments can be made. Furthermore, the device is of such a character that the tests can be made in any part of a garage, on the street, or out on the road. This obviates the use of the large and cumbersome devices which are now in use in garages, and which occupy much needed space. Usually these devices are built into the floor of the garage, and when not in use, they occupy a floor space which could be conveniently used for other purposes. With the present device, no such loss of space is necessary, as the tests can be made, while the automobile is in any convenient portion of the garage. In view of the fact that the different wheels, of an automobile, must be rotated in a forward direction, it will be understood that, when the device is applied to either the front or rear wheel, on the right hand side of the automobile, the operator will rock the lever 19 toward the right. When the device is applied to a wheel on the left hand side of the autmobile, the lever 19 must be rocked toward the left, so as to rotate the wheel toward the front of the automobile. In view of the fact that the lever 19 is mounted on the frame, and connected with the gauge as to operate such gauge, when the lever is rocked in either direction, it will be apparent that the one device may be successfully operated on any of the four wheels of the automobile. This is due to the two links 25 and 26, which are both connected with the arm 22, and also slidably pivoted to the member 21.

It is to be further understood that, when using the device, the wheel may be jacked up, if desired.

In Figure 4 there is shown a modification of the gauge, wherein a coil spring 34 is disposed within the casing 35, which is mounted on one of the arms of the U-shaped frame 13. The arm 22 is connected with the plunger 36, within the casing 35, and compresses the spring, as will be readily understood, such plunger having a hand 37 which registers with the scale 38, at one side of the slot 39, of the casing.

What is claimed is:

1. A brake testing device comprising a frame adapted to be clamped to a wheel, a gauge mounted on the frame, a lever pivoted on the frame, an arm pivotally carried by the frame, yieldable resisting means operatively connected with said arm and gauge, and links connected with said lever and said arm and separately operable by the lever when the latter is rocked in opposite directions.

2. A brake testing device comprising a frame adapted to be clamped to a wheel, a pressure gauge mounted on the frame, an arm pivotally mounted on the frame, means yieldably connecting the arm and the gauge for operating the latter upon movement of the former, a transverse lever pivoted at its middle point on the frame and having a handle thereon, and links commonly pivoted to said arm and each having an end slidably and pivotally connected with an end of said lever.

3. A brake testing device comprising a frame adapted to be clamped to a wheel, a pressure gauge, yieldable gauge operating means connected thereto, a transverse arm pivoted to the frame and having one end pivotally connected with said operating means, a centrally pivoted lever mounted on the frame and rockable in either direction, and links commonly pivoted to said transverse arm and slidably connected with the ends of said lever.

4. A brake testing device comprising a U-shaped frame the arms of which have tire engaging means, an arm adjustably connected with the bight portion of said frame and having tire engaging means, an arm pivotally connected at one end to one arm of said frame, a gauge, gauge operating means mounted on the other arm of said frame, yieldable connections between said pivoted arm and said gauge operating means, a rock lever pivotally mounted at its middle point on the frame, and links pivotally connected with the intermediate portion of said pivoted arm and having slotted connections with the end portions of said rock lever.

In testimony whereof, I affix my signature.

FRANKLIN S. BELKNAP.